May 19, 1959     J. H. WILSON     2,886,876
APPARATUS FOR MOLDING CONCRETE BUILDING SLABS
Original Filed Aug. 22, 1949     3 Sheets-Sheet 3
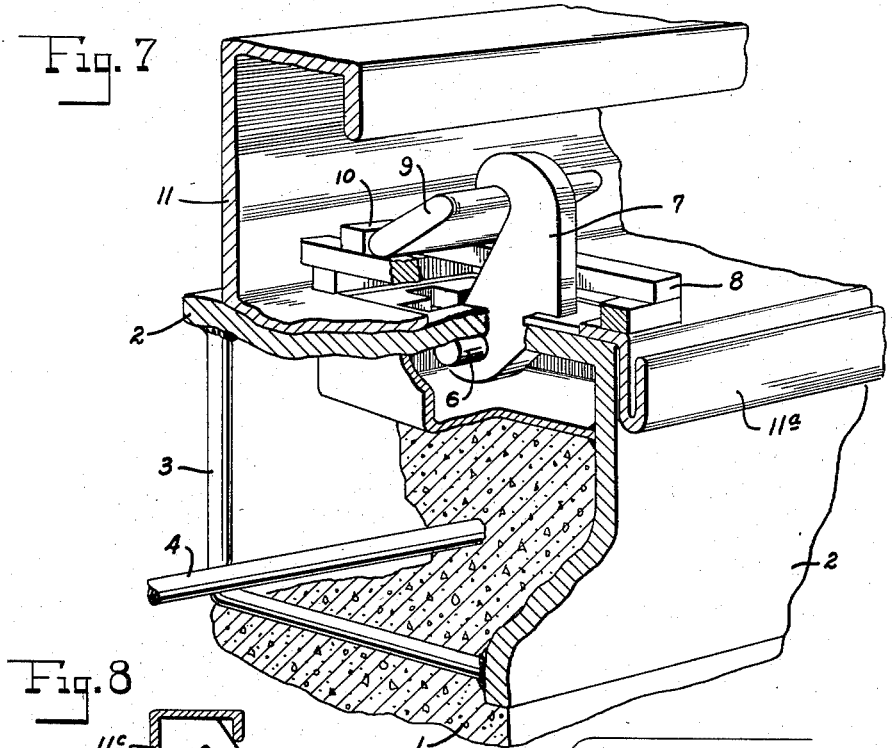
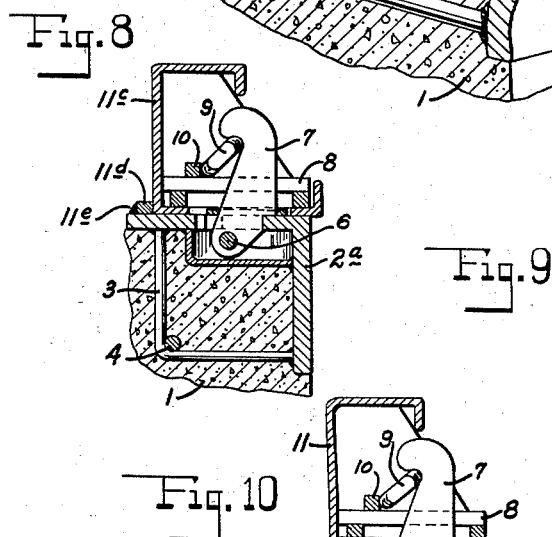
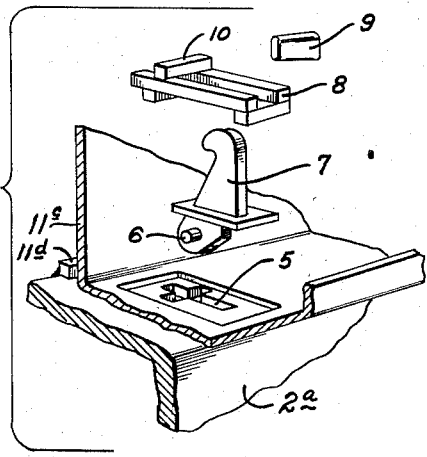
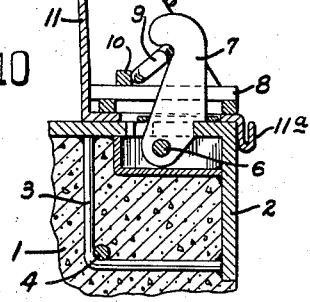
INVENTOR.
John Hart Wilson
BY
Wayland D. Keith
HIS AGENT

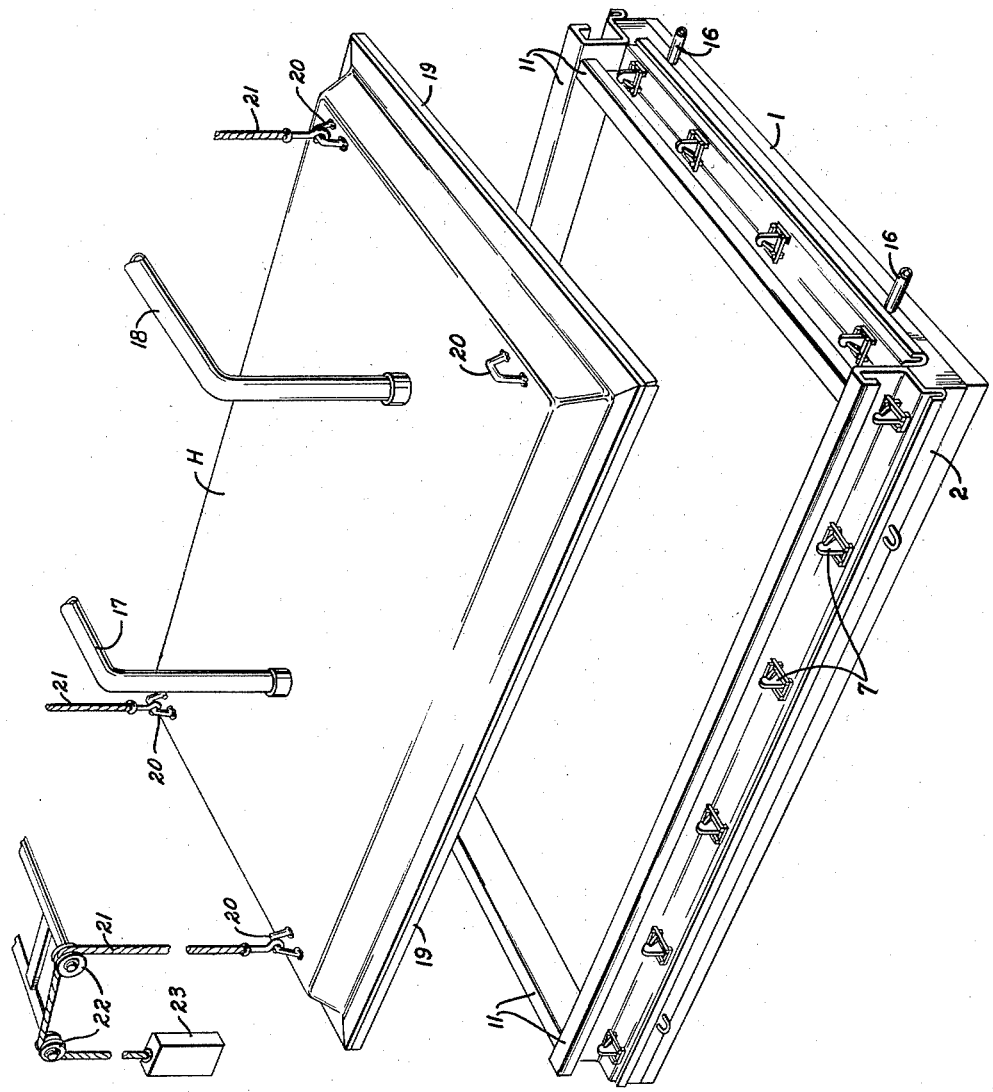

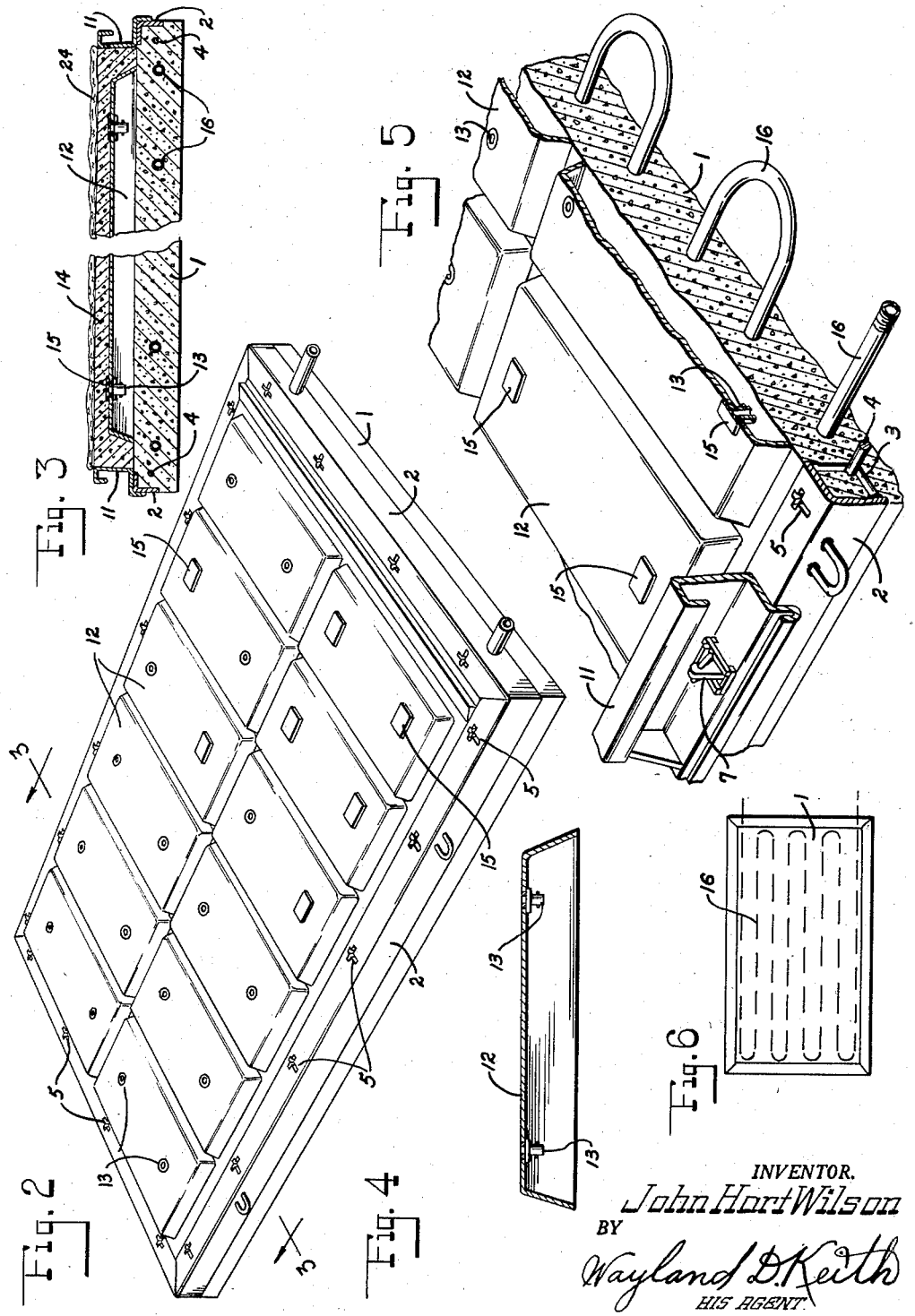

United States Patent Office 2,886,876
Patented May 19, 1959

2,886,876

APPARATUS FOR MOLDING CONCRETE BUILDING SLABS

John Hart Wilson, Wichita Falls, Tex.

Substituted for abandoned application Serial No. 111,612, August 22, 1949. This application March 7, 1956, Serial No. 570,137

3 Claims. (Cl. 25—121)

This application is a substitute for prior application, Ser. No. 111,612, filed August 22, 1949, now abandoned.

This invention relates to improvements in apparatus for molding and curing concrete building slabs.

Heretofore, the molding of concrete building slabs and the curing of same required so much time and equipment as to materially retard building progress and increase the expense of concrete slab buildings.

However, in the present apparatus, provision is made for molding and curing concrete building slabs in an expeditious and efficient manner so that the maximum number of such slabs may be molded and cured with the minimum amount of equipment.

An object of this invention is to provide for the molding and curing of concrete building slabs so that they may be handled within a few hours after being molded.

Another object of the invention is to provide for the molding and removal of concrete slabs from a molding table in a quick and expeditious manner.

Still another object of the invention is to provide for the removal of the core elements from the concrete slab, after the concrete slab has been molded.

Yet another object of the invention is to provide for the handling of the molding equipment preparatory to, during, and after the molding operation, as to enable the efficient molding, curing and handling of the concrete building slab.

An embodiment of this apparatus is illustrated in the accompanying drawings, in which:

Fig. 1 is a perspective view of the mold table with the core elements removed and showing the curing hood suspended above the table;

Fig. 2 is a perspective view of the mold table with the core elements in place, but without the side forms and covering hood;

Fig. 3 is a sectional view taken transversely through the mold table, with parts broken away and with parts shortened, and showing the heat insulation member thereover, a portion of the concrete slab being shown therein;

Fig. 4 is a longitudinal sectional view through one of the core members, showing air release members connected thereto;

Fig. 5 is a fragmentary view of a portion of the mold table, with parts broken away and with parts shown in section to illustrate the details of construction;

Fig. 6 is a top plan view of the mold table showing diagrammatically the arrangement of the heating coil therein;

Fig. 7 is a detail, perspective view of a portion of the mold table, with parts shown in section, and with parts broken away so as to show the locking arrangement for the side frame members of the mold table;

Fig. 8 is a side elevational view of a portion of the mold table in modified form, with parts broken away and shown in section to illustrate the details of construction;

Fig. 9 is an exploded perspective view of the parts shown in Fig. 7, but showing the disassembled side form holding members; and Fig. 10 is a view similar to Fig. 8, but of the form of the invention as shown in Figs. 1, 5, and 7.

With more detailed reference to the drawing, the numeral 1 designates a mold table, which is preferably constructed of concrete, and has a metal edging strip or angle iron members 2 embedded in the corners thereof and which angle irons are held in place by reinforcement members 3 and 4 welded thereto and embedded in the concrete of the mold table. The angle iron members 2 have cruciform openings at spaced intervals therealong, each opening to receive a pin 6, as will best be seen in Figs. 9 and 10. The pin 6 passes through a hook member 7, which hook member is adapted to pass through a slot in member 8, as will best be seen in Figs. 5 and 7.

A wedge 9 is adapted to engage beneath the hook of member 7 and to engage the bar 10 of the slotted member 8. By forcing the wedge beneath the hook, the slotted member 8 will be pressed downward on side frames 11 to hold these side frames in secure relation with rsepect to the angle irons 2 and mold table 1. With the side forms 11 locked in place by hook members 7, the table forms a receptacle for receiving plastic concrete mixtures. However, for the sake of saving material, and when desired, to make the slab lighter, hollow core members, designated at 12 and shown in Figs. 2, 3, and 5 may be used. These core members are metal pans, similar to those shown and described in my Patent No. 2,416,559, granted February 25, 1947, Apparatus for Molding and Handling Concrete Slabs.

A coupling 13 is provided, to which an air hose may be quickly attached and detached, and through which air is introduced intermediate the inner surfaces of the core pan 12 and the complementary surface of the building slab 14, as will best be seen in Fig. 3. In using the core pans 12, it is preferable to place a piece of rubber or gasket material 15 over the air coupling 13 to prevent the entrance of plastic concrete into the opening thereof. This gasket material is relatively thin and does not hinder the molding operation in any way.

The mold table 1 has a pipe 16, forming a coil as shown in Figs. 5 and 6, positioned therein to which coiled pipe may be attached a hot water supply pipe for directing hot water therethrough, at a temperature conducive to the quick and effective setting of the plastic concrete, yet not of sufficient heat to impair the strength thereof. While hot water is being passed through the mold table beneath the slab, steam may be circulated through hose 17 into hood H and out through hose 18 to maintain the top portion of the slab being molded at the desired temperature. The hood H is provided with a gasket 19 around the lower edge thereof for sealing action with the side forms 11. If desired to maintain a static steam pressure on the upper surface of the slab being molded, this can be done by introducing steam into pipes 17 and 18, and maintaining a pressure thereon.

It is preferable to have eyes 20 at spaced points around the top of hood H, to which cables 21 may be attached for the lifting of the hood H. These cables may be passed over pulleys 22 and be attached to counterweights 23, to enable the hood to be easily operated manually, if desired.

Under certain conditions, it is desirable to use an insulating blanket 24 to retard the radiation of heat from slab 14, as shown in Fig. 3, while heat is applied by hot water passing through pipe 16.

Two forms of side forms are shown. The form as shown in Figs. 1, 3, 5, 7, and 10 has an outer ledge 11a overhanging in contact relation with the outer face of angle iron 2, so as to gauge the position of the inner face of side form 11. However, the form of side frame as shown in Figs. 8 and 9 has a gauge bar 11d welded at 11e to the angle iron 2a. This enables the inner face of mold member 11c to be positioned against bar 11d and clamped in place by hook 7, in the same manner as the side frame member 11. The bar 11e precludes the entrance of plastic concrete beneath the mold member 11c and prevents the breaking or chipping of the slab upon its being removed from the mold.

*Operation*

In the operation of the present mold table, hot water from a hot water system passes through pipe 16, and with side members 11 bindingly engaging with the mold table to form a cavity, the plastic concrete may be poured into the cavity so formed, as shown in Fig. 1, or, core pans may be placed along the face of the mold table, as shown in Figs. 2, 3 and 5, to form a mold of a specific character, and over which plastic concrete may be poured, as shown in Fig. 3.

The hood H is then lowered into place to interfit with the upper face of the side frame members 11, and with the gasket 19 forming a sealing joint therebetween, the slab is ready for the curing process. A steam system is connected to the pipes 17 and 18 for the circulation of steam into and/or through hood H, and with hot water circulating through pipes 16 and 17, and with steam being directed to the hood H, as above mentioned, the plastic concrete is cured to the desired hardness, at which time the circulation of hot water through pipe 16, and the application of steam to the hood H may be discontinued, and the hood raised and suspended by cables 21. Then the side forms 11 are removed to permit the removal of the slab 14 from the mold table. After the concrete slab has been removed from the mold and positioned vertically, an air hose may be connected to connectors 13, as by a bayonet type connector on the air hose, and pressure applied to connectors 13, which will cause air pressure to be introduced intermediate the concrete slab 14, and the complementary face of the poured portion of the concrete slab, which will cause the core pans 12 to be forced out of the cavity in the concrete slab 14 by air pressure.

Having thus described the invention, what is claimed is:

1. An apparatus comprising a base formed of concrete, a strip of metal edging formed around the upper periphery of said base, which edging has inturned flanges extending inward from the edge of said base and secured thereto, cross-shaped apertures formed in said inturned flanges at spaced intervals throughout the length of said flanges, recesses formed in said concrete base below said cross-shaped apertures to admit a fastening element which passes through said cross-shaped apertures, upstanding side walls having horizontally outwardly extending flanges arranged around the periphery of said base, said outstanding flanges having apertures therein, which apertures are adapted to register respectively with said cross-shaped apertures in said inturned flanges, a hook shaped fastening member having lugs projecting laterally outward from the lower end thereof, which lugs are adapted to pass through said cross-shaped apertures and to interengage said inturned flange adjacent and below said cross-shaped apertures and extending up through said apertures in said outstanding flange, and a wedge member interposed between said hook member and said outstanding flange for bindingly engaging said outstanding flange to said inturned flange secured to said concrete base.

2. An apparatus for molding concrete building slabs comprising a base formed of concrete, a strip of metal edging formed around the upper periphery of said base, which edging has inturned flanges extending inward from the edge of said base and secured thereto, cross-shaped apertures formed in said inturned flanges at spaced intervals throughout the length of said flanges, recesses formed in said concrete base below said cross-shaped apertures to admit a fastening element which passes through each of said cross-shaped apertures, upstanding side walls having horizontally outwardly extending flanges arranged around the periphery of said base, apertures formed in said outstanding flanges registering respectively with said cross-shaped apertures, a hook shaped fastening member having pins projecting laterally from its lower end, which pins are adapted to pass through said cross-shaped apertures and to interengage said inturned flange adjacent and below said cross-shaped apertures and extending up through said apertures in said outstanding flange, a bridge member surrounding each aperture in said outstanding flanges and having an upstanding abutment thereon and projecting thereabove, and a wedge member interposed between said hook member and said bridge member in abutting relation with said upstanding abutment whereby said wedge member is wedgingly interposed between said hook member and said bridge member so said outstanding flange will bindingly engage said inturned flange which is secured to said concrete base.

3. An apparatus for molding concrete building slabs comprising a horizontal base, a metal edging strip disposed around and overlying the periphery of the upper surface of said base and forming a marginal portion thereof, a series of spaced apertures in said strip, recesses in the base beneath the respective apertures, vertically disposed side wall members resting upon said base around its periphery and having flanged portions overlying said strip and provided with openings substantially in registry with said apertures and recesses, fastening elements having their lower ends respectively passing through said apertures and openings and entering the adjacent recesses, and their upper ends extending upwardly from the openings, projections on both the upper and lower ends of the fastening elements, the lower projections adapted to engage and be retained beneath the margins of the aperture in said marginal base strip, and a wedging element interposed between the upper projections of each fastening element and said side wall members.

References Cited in the file of this patent

UNITED STATES PATENTS

| | | |
|---|---|---|
| 896,330 | Scheelky | Aug. 18, 1908 |
| 1,207,697 | Atterbury | Dec. 12, 1916 |
| 1,554,586 | Lake | Sept. 22, 1925 |
| 2,044,786 | Harshberger | June 23, 1936 |
| 2,101,992 | Fish | Dec. 14, 1937 |
| 2,188,726 | Rose | Jan. 30, 1940 |
| 2,240,776 | Henderson | May 6, 1941 |
| 2,250,020 | Henderson | July 22, 1941 |
| 2,306,107 | Henderson | Dec. 22, 1942 |
| 2,377,480 | Cann | June 5, 1945 |
| 2,416,559 | Wilson | Feb. 25, 1947 |
| 2,594,324 | Louckes | Apr. 29, 1952 |